United States Patent
Tsai et al.

(10) Patent No.: US 8,619,124 B2
(45) Date of Patent: Dec. 31, 2013

(54) VIDEO DATA PROCESSING SYSTEMS AND METHODS

(75) Inventors: Ya-Chi Tsai, Hsinchu (TW); Meng-Han Tsai, Zhubei (TW); Chih-Chun Yang, Yuanshan Township, Yilan County (TW); Ji-Da Chen, Kaohsiung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 432 days.

(21) Appl. No.: 12/979,963

(22) Filed: Dec. 28, 2010

(65) Prior Publication Data

US 2012/0092455 A1  Apr. 19, 2012

Related U.S. Application Data

(60) Provisional application No. 61/393,275, filed on Oct. 14, 2010.

(51) Int. Cl.
   *H04N 13/00* (2006.01)

(52) U.S. Cl.
   USPC .............................................. 348/44; 348/42

(58) Field of Classification Search
   USPC .................................. 348/40–161
   See application file for complete search history.

(56) References Cited

U.S. PATENT DOCUMENTS

| 5,613,048 A * | 3/1997 | Chen et al. .................... 345/419 |
| 6,020,890 A * | 2/2000 | Kohda .......................... 345/419 |
| 6,564,380 B1 * | 5/2003 | Murphy ........................... 725/86 |
| 7,136,415 B2 * | 11/2006 | Yun et al. .................. 375/240.26 |
| 7,551,770 B2 * | 6/2009 | Harman ......................... 382/154 |
| 7,940,987 B2 * | 5/2011 | Bober et al. ................... 382/190 |
| 7,973,791 B2 * | 7/2011 | Mihara .......................... 345/426 |
| 2003/0043146 A1 * | 3/2003 | Kitamura et al. ............. 345/419 |
| 2005/0256391 A1 * | 11/2005 | Satoh et al. ................... 600/407 |
| 2006/0143020 A1 * | 6/2006 | Zaima .............................. 705/1 |
| 2008/0228434 A1 * | 9/2008 | Aratani et al. ................ 702/150 |
| 2009/0022369 A1 * | 1/2009 | Satoh et al. ................... 382/106 |
| 2011/0134149 A1 * | 6/2011 | Tsai .............................. 345/684 |

OTHER PUBLICATIONS

Mel Siegel et al., Compression and Interpolation of 3D-Stereoscopic and Multi-View Video, The Robotics Institute, Carnegie Mellcon University (May 15, 1997).

(Continued)

*Primary Examiner* — Joseph Ustaris
*Assistant Examiner* — Talha Nawaz
(74) *Attorney, Agent, or Firm* — Finnegan, Henderson, Farabow, Garrett & Dunner, LLP (57) ABSTRACT

A video data processing system comprises a control module coupled with a source module for receiving video data from the source module, the video data being associated with at least one source viewpoint; and a view adjustment module coupled with the control module for generating at least one adjusted viewpoint of the video data based on at least one of a set viewpoint number and a number of the at least one source viewpoint. The set viewpoint number is associated with at least one of a viewpoint number of at least one previously received video data and a viewpoint number of at least one previously coupled player module.

22 Claims, 8 Drawing Sheets

(56) References Cited

OTHER PUBLICATIONS

Steven M. Seitz et al., A Comparison and Evaluation of Multi-View Stereo Reconstruction Algorithms, 2006 IEEE Computer Society Conference on Computer Vision and Pattern Recognition, vol. 1 (CVPR '06), Jun. 17-22, 2006.

Vlad I. Morariu et al., Modeling Correspondences for Multi-Camera Tracking Using Nonlinear Manifold Learning and Target Dynamics, 2006 IEEE Computer Society Conference on Computer Vision and Pattern Recognition, vol. 1 (CVPR '06), Jun. 17-22, 2006.

Zhenyu Yang et al., A Multistream Adaptation Framework for Bandwidth Management in 3D Tele-immersion, ACM 1-59593-285-2/06/0005, NOSSDAV '06 (2006).

Kurutepe Engin et al., Interactive transport of multi-view videos for 3DTV applications, School of Engineering, Koc University, Instanbul, Turkey; Received Nov. 25, 2005, Revision accepted Feb. 27, 2006.

Jian-Guang Lou et al., A Real Time Interactive Multi-View Video System, ACM 1-59593-044-2/05/0011, MM '05, Nov. 6-11, 2005.

* cited by examiner

VIDEO DATA PROCESSING SYSTEMS AND METHODS

RELATED APPLICATIONS

This application claims the benefit of priority of U.S. Provisional Application No. 61/393,275, filed Oct. 14, 2010, and titled "Dynamic View Number Adjustment Video System With Publishing, Storage, Streaming, And Displaying", the entire contents of which are incorporated herein by reference.

TECHNICAL FIELD

This disclosure relates in general to video data processing systems and methods and, more particularly, video data processing systems and methods for uploading, processing, and/or downloading video data.

BACKGROUND

A three-dimension (3D) image is formed according to the concept of stereoscopic vision as observed by the two eyes of a human being. The three-dimensional image display techniques may be classified into a glass-based display technique that requires users to wear stereoscopic glasses to observe three-dimensional images; and a glass-less stereoscopic-display technique that enables users to observe three-dimensional images with naked eyes (and without wearing specialized glasses).

Multi-view, three-dimensional images can be displayed in various modes, such as a two-dimensional mode, a stereoscopic mode and an auto-stereoscopic mode. For each display mode, the number of viewpoint of three-dimensional images can be different. Three-dimensional video player module often needs to display multi-view, three-dimensional video data based on the specific display mode and the number of viewpoint supported by the three-dimensional video player module.

SUMMARY

Consistent with the disclosed embodiments, there is provided a video processing system comprising a control module coupled with a source module for receiving video data from the source module, the video data being associated with at least one source viewpoint; and a view adjustment module coupled with the control module for generating at least one adjusted viewpoint of the video data based on at least one of a set viewpoint number and a number of the at least one source viewpoint. The set viewpoint number is associated with at least one of a viewpoint number of at least one previously received video data and a viewpoint number of at least one previously coupled player module.

Also, consistent with the disclosed embodiments, there is provided a video data processing method comprising receiving video data from the source module, the video data being associated with at least one source viewpoint; and generating at least one adjusted viewpoint of the video data based on at least one of a set viewpoint number and a number of the at least one source viewpoint. The set viewpoint number is associated with at least one of a viewpoint number of at least one previously received video data and a viewpoint number of at least one previously coupled player module.

Still consistent with the disclosed embodiments, there is provided a video data processing system comprising a control module coupled with a player module for gathering a destination viewpoint number associated with the player module; and a view adjustment module coupled with the control module for adjusting a number of at least one viewpoint of video data based on at least one of the destination viewpoint number and the number of the at least one viewpoint of the video data. The number of the at least one viewpoint of the video data is associated with at least one of a viewpoint number of at least one previously received video data and a viewpoint number of at least one previously coupled player module.

Yet still consistent with the disclosed embodiments, there is provided a video data processing method comprising gathering a destination viewpoint number associated with a player module; and adjusting a number of at least one viewpoint of video data based on at least one of the destination viewpoint number and the number of the at least one viewpoint of the video data. The number of the at least one viewpoint of the video data is associated with at least one of a viewpoint number of at least one previously received video data and a viewpoint number of at least one previously coupled player module.

It is to be understood that both the foregoing general description and the following detailed description are exemplary and explanatory and are not restrictive of the subject matter as claimed.

BRIEF DESCRIPTION OF THE DRAWINGS

The accompanying drawings, which are incorporated in and constitute a part of this specification, serve to explain the objects, advantages, and principles of the disclosed embodiments.

In the drawings.

DESCRIPTION OF THE EMBODIMENTS

Reference may now be made in detail to the present embodiments, examples of which are illustrated in the accompanying drawings. Wherever possible, the same reference numbers may be used throughout the drawings to refer to the same or like parts.

Figure 1:
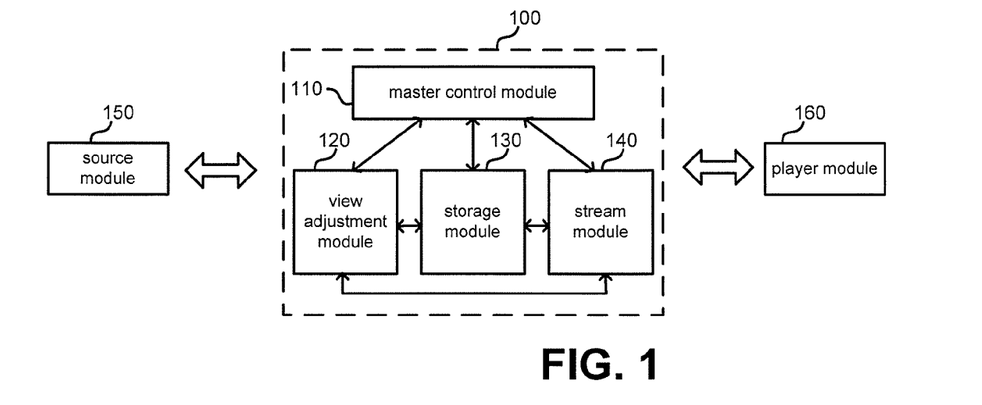
FIG. 1 illustrates an exemplary video data processing system consistent with a disclosed embodiment.

FIG. 1 illustrates an exemplary video data processing system consistent with a disclosed embodiment. In this embodiment, a video data processing system 100 may be coupled with a source module 150 through wired or wireless network communication. The source module 150 may include a personal computer, a laptop (such as laptop computer, notebook, or netbook), a digital camera, a video recorder, a photographer, a video player (such as DVD player), an internet website, and any other video streaming device or platform for providing video data. Furthermore, the video data processing system 100 may be coupled with a player module 160 through wired or wireless network communication modules. In this embodiment, the player module 160 may include at least a video player and a software program for displaying video data.

As illustrated in FIG. 1, the video data processing system 100 in one embodiment may further include a master control module 110, a view adjustment module 120, a storage module 130, and a stream module 140. In this embodiment, each module is coupled to the other three modules. The operation of each module of the video data processing system 100 illustrated in FIG. 1 may follow one or more of the embodiments explained in greater detail below.

In an embodiment, the video data processing system 100 may provide an uploading function for receiving video data uploaded from the source module 150, a processing function for adjusting viewpoint number of the uploaded video data, and a downloading function for downloading the video data with the adjusted viewpoint number to the player module 160. In this embodiment, the video data may include at least one image. For each image of the video data, it may include at least one of a two-dimensional image, a three-dimensional image, or a combination of at least one of two-dimensional images and at least one of three-dimensional images. Furthermore, if the video data includes at least one three-dimensional image, the at least one three-dimensional image may further include one or more viewpoints which enable users to observe at least one three-dimensional image from different viewpoints.

Figure 2:
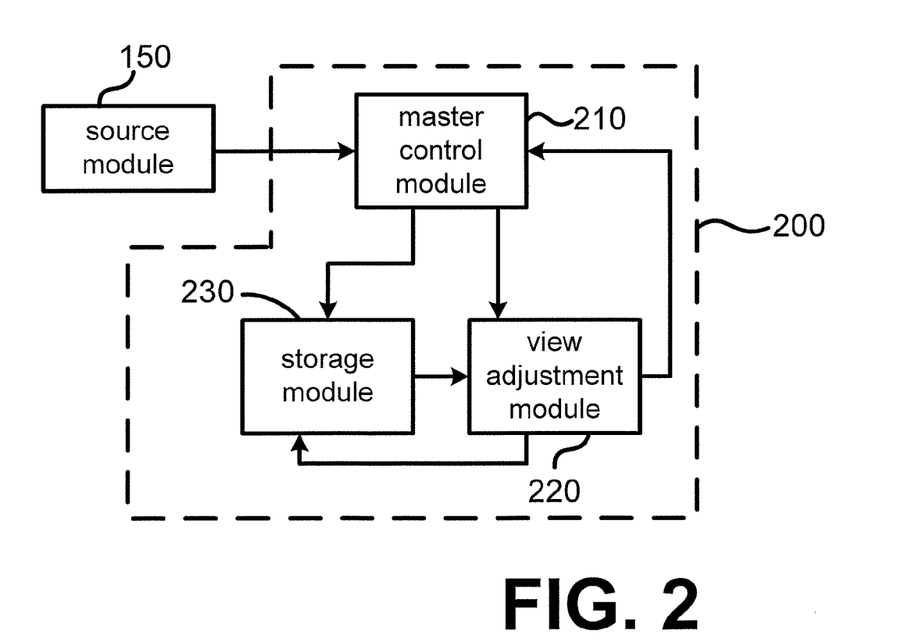
FIG. 2 illustrates an exemplary video data processing system for uploading video data consistent with a disclosed embodiment.

FIG. 2 illustrates an exemplary video data processing system for uploading video data consistent with a disclosed embodiment. In one embodiment, the video data processing system 200 may upload video data from the source module 150. In this embodiment, the video data processing system 200 may further include a master control module 210 coupled with the source module 150, a view adjustment module 220 coupled with the master control module 210, and a storage module 230 coupled with the master control module 210 and the view adjustment module 230. The operation of each module of the video data processing system 200 illustrated in FIG. 2 may follow one or more of the embodiments explained in greater detail below.

Figure 3A:
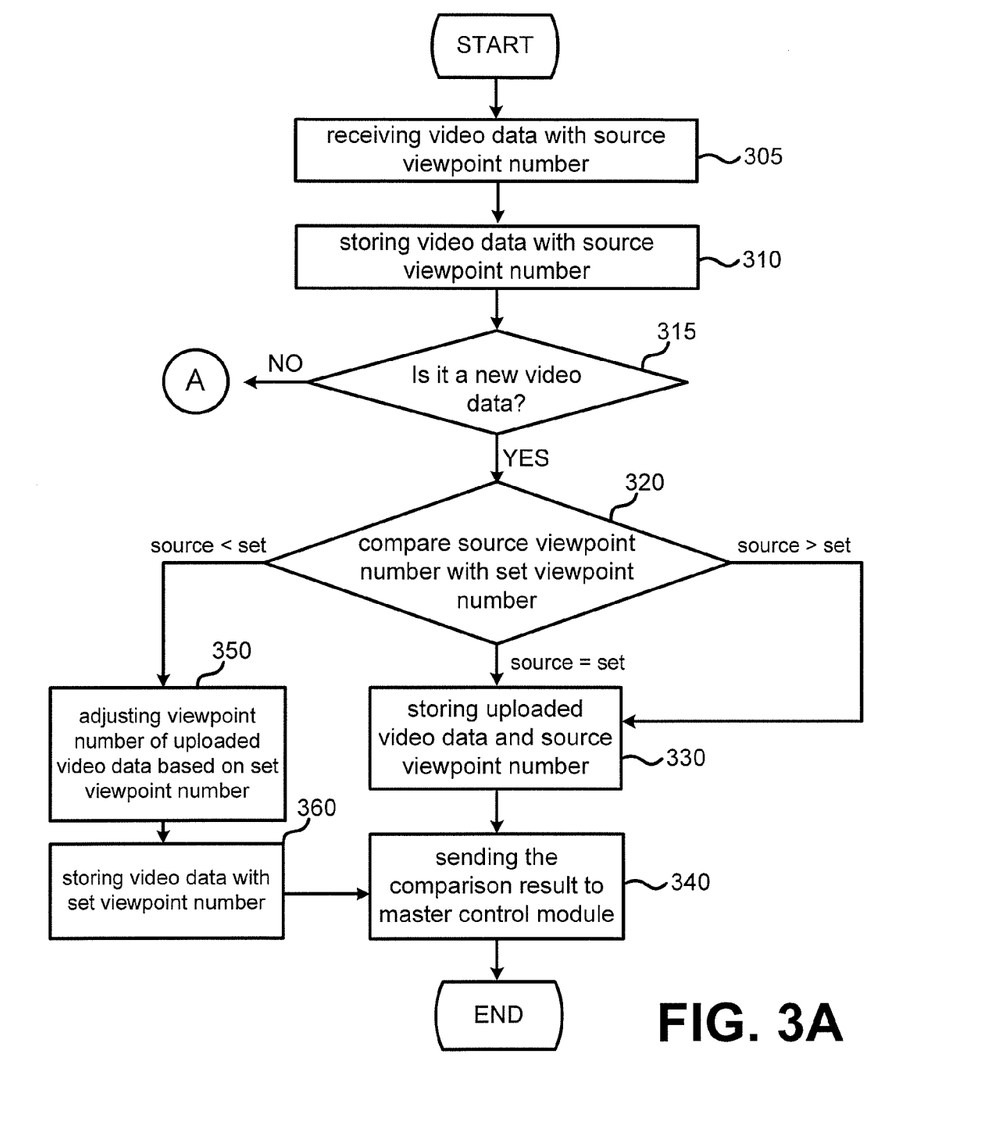
FIGS. 3A & 3B illustrate an exemplary method for uploading video data consistent with a disclosed embodiment.
Figure 3B:
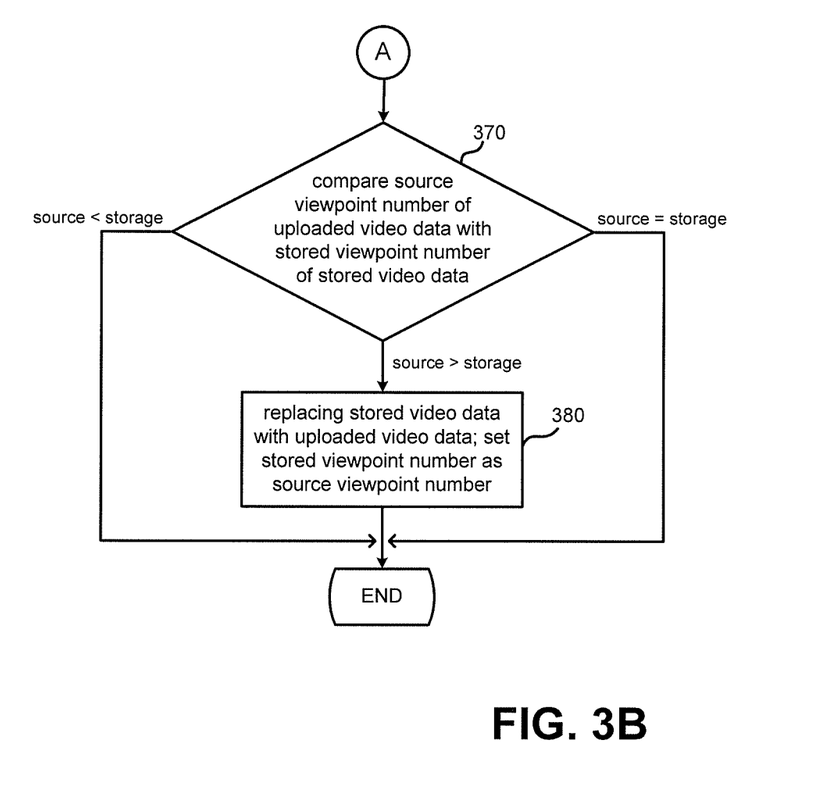

FIGS. 3A & 3B illustrate an exemplary method for uploading video data from a source module to a video processing system consistent with a disclosed embodiment. In an embodiment, a method for uploading video data from the source module 150 to the video processing system 200 may include the following steps. In step 305, the master control module 210 may receive a video data and a source viewpoint number associated with the video data uploaded from the source module 150. As described above, the uploaded video data in this embodiment may include at least one image. For each image of the uploaded video data, it may include at least one of a two-dimensional image, a three-dimensional image, or a combination of at least one of two-dimensional images and at least one of three-dimensional images. Furthermore, if the uploaded video data includes at least one three-dimensional image, the three-dimensional images of the uploaded video data may include a source viewpoint number that enable users to observe the three-dimensional image from different viewpoints.

In step 310, after being received by the master control module 210, the uploaded video data and the source viewpoint number associated with the upload video data are stored in the storage module 230. Then, in step 315, the master control module 210 may determine whether the uploaded video data is a new video data to the video data processing system 200. In an embodiment, the video data processing system 100 may store the video data being previously uploaded to the video data processing system 100. When receiving a newly uploaded video data, the master control module 110 determines whether the content of the newly uploaded video data is consistent with the content of at least one of the previously uploaded video data. If the content of the newly uploaded video data is not consistent with that of any previously uploaded video data, the newly uploaded video data is a new video data to the video data processing system 200. If the content of the newly uploaded video data is consistent with that of at least one of the previously uploaded video data, the newly uploaded video data is not a new video data to the video data processing system 200. In this embodiment, if the uploaded video data is a new video data to the video data processing system 200, the uploaded video data and the associated source viewpoint number may be sent to the view adjustment module 220.

Figure 4:
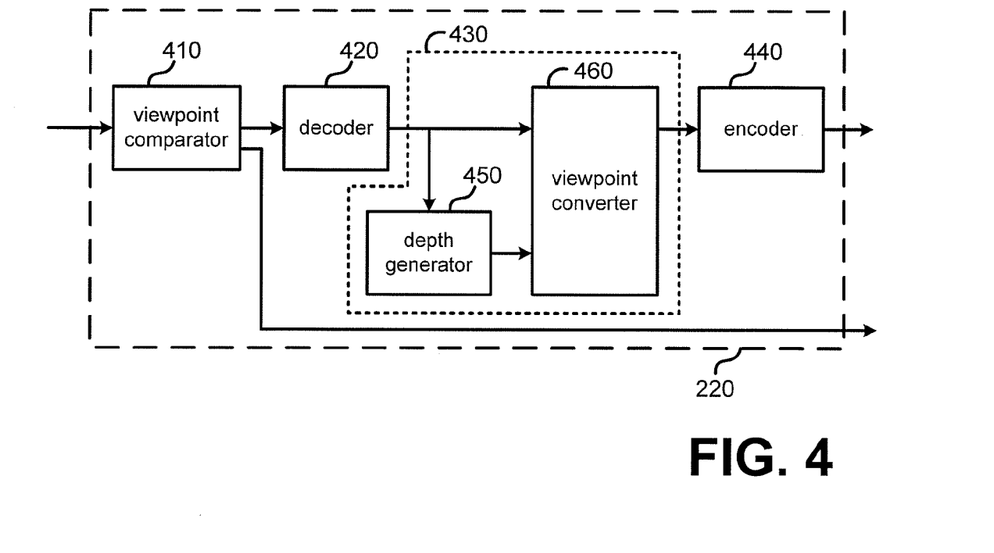
FIG. 4 illustrates a functional block diagram of an exemplary view adjustment module for uploading consistent with a disclosed embodiment.

FIG. 4 illustrates a functional block diagram of an exemplary view adjustment module consistent with a disclosed embodiment. In an embodiment, the view adjustment module 220 may further include a viewpoint comparator 410 coupled with the storage module 230 and the master control module 210, a decoder 420 coupled with the viewpoint comparator 410, a viewpoint adjuster 430 coupled with the decoder 420, and an encoder 440 coupled with the viewpoint adjuster 430. The operation of each functional block of the view adjustment module 220 illustrated in FIG. 4 may follow one or more of the embodiments explained in greater detail below.

In an embodiment, if the uploaded video data is a new video data to the video data processing system 200, the uploaded video data and the associated source viewpoint number may be sent to the viewpoint comparator 410 of the view adjustment module 220. The viewpoint comparator 410 may compare the source viewpoint number associated with the uploaded video data with the viewpoint number set by the master control module 210. Referring to FIG. 3A, if the source viewpoint number is larger than or consistent with the viewpoint number set by the master control module 210, in step 330, the view adjustment module 220 may output the uploaded video data and the associated source viewpoint number to the storage module 230 for storage. In this embodiment, the stored video data is consistent with the uploaded view data and the stored viewpoint number associated with the stored video data is consistent with the source viewpoint number.

In an embodiment, the viewpoint number set by the master control module 210 may be determined based on the viewpoint number associated with most of the previously uploaded video data. In this embodiment, it is more likely that the source viewpoint number of the newly uploaded video data is consistent with the viewpoint number set by the master control module 210 than other embodiments which the viewpoint number set by the master control module 210 may not be determined based on the viewpoint number associated with most of the previously uploaded video data. Since it is more likely that the source viewpoint number of the newly uploaded video data is consistent with the viewpoint number set by the master control module 210, it is also more likely that the viewpoint comparator 410 in this embodiment may output the newly uploaded video data and the associated source viewpoint number to the storage module 230 without further processing by the view adjustment module 220. Thus, in this embodiment, it is more likely that the time and the resource of the video data processing system 100 for processing the uploaded video data may be saved.

Referring to FIG. 3A, after the viewpoint comparator 410 determines that the source viewpoint number is larger than or consistent with the viewpoint number set by the master control module 210, in step 340, the view adjustment module 220 may send to the result of comparison to the master control module 210.

In another embodiment, if the source viewpoint number is smaller than the viewpoint number set by the master control module 210, in step 350, the view adjustment module 220 may adjust the viewpoint number of the uploaded view data based on the viewpoint number set by the master control module 210.

In an embodiment, the uploaded video data and the associated source viewpoint number are both in compressed form. In this embodiment, both the uploaded video data and the associated source viewpoint number may be sent to the decoder 320 for decompression. After decompression, the decompressed uploaded video data and the associated source viewpoint number may be sent to the viewpoint adjuster 430.

Furthermore, in an embodiment, the uploaded video data may include the source viewpoint number smaller than the viewpoint number set by the master control module 210. In this embodiment, the viewpoint adjuster 430 may generate new viewpoints associated with the uploaded video data so that the uploaded video data may include the source viewpoints and the adjusted viewpoints. The number of the source viewpoints and the adjusted viewpoints is consistent with the viewpoint number set by the master control module 210. Referring to FIG. 4, the viewpoint adjuster 430 may further include a depth generator 450 and a viewpoint converter 460, both are coupled with the decoder 420. In an embodiment, if the uploaded video data includes at least one three-dimensional image and the at least one three-dimensional image further include an associated depth information, the decoder 420 may output the decompressed at least one three-dimensional image of the uploaded video data and the associated depth information to the viewpoint converter 460. The depth information is associated with the depth (Z-axis) relationship among each object within the at least one three-dimensional image. The viewpoint converter 460 may generate new viewpoints associated with the decompressed at least one three-dimensional image and different from the associated source viewpoints based on the decompressed at least one three-dimensional image and the associated depth information. In this embodiment, the number of new viewpoints generated by viewpoint converter 460 may be consistent with the difference between the viewpoint number set by the master control module 210 and the source viewpoint number.

Referring to FIG. 4, in another embodiment, if the uploaded video data includes at least one three-dimensional image and the at least one three-dimensional image of the uploaded video data, after decompression, may not include an associated depth information, the decompressed at least one three-dimensional image may be sent to the depth generator 450 from the decoder 420. The depth generator 450 may generate the depth information associated with the decompressed at least one three-dimensional image. Then, the depth generator 450 may provide the generated depth information associated with the decompressed at least one three-dimensional image to the viewpoint converter 460. The viewpoint converter 460 may generate new viewpoints associated with the decompressed at least one three-dimensional image and different from the associated source viewpoints based on the decompressed at least one three-dimensional image of the uploaded video data and the associated depth information generated by the depth generator 450. In this embodiment, the number of viewpoint associated with the decompressed at least one three-dimensional image generated by viewpoint converter 460 may be consistent with the difference between the viewpoint number set by the master control module 210 and the source viewpoint number associated with the uploaded video data.

The viewpoint converter 460 may output the at least one three-dimensional image of the video data with the adjusted viewpoints (including the source viewpoints and the viewpoints generated by the viewpoint adjuster 430) to the encoder 440 for compression. In this embodiment, the number of the adjusted viewpoints is consistent with the number of the predetermined viewpoint.

Referring to FIG. 3A, in step 360, the encoder 440 may output the compressed video data with the adjusted viewpoint to the storage module 230 and the stored viewpoint number associated with the compressed video data is consistent with the viewpoint number set by the master control module 210. Then, in step 340, after the viewpoint comparator 410 determines that the source viewpoint number is smaller than the viewpoint number set by the master control module 210, the view adjustment module 220 may send to the result of comparison to the master control module 210.

Referring to FIG. 3B, in step 315, if the newly uploaded video data is consistent with at least one of the previously uploaded video data, the newly uploaded video data is not a new video data to the video data processing system 200. In this embodiment, in step 370, the source viewpoint number associated with the uploaded video data and the stored viewpoint number associated with the stored video data, which is consistent with the uploaded video data, may be sent to the viewpoint comparator 410 for comparison. In an embodiment, if the source viewpoint number is larger than the stored viewpoint number, in step 380, the newly uploaded video data may be stored in the storage module 230 to replace the previously stored video data consistent with the uploaded video data. In addition, the stored viewpoint number is replaced with the source viewpoint number associated with the newly uploaded video data. In another embodiment, if the source viewpoint number is smaller than or consistent with the stored viewpoint number, the newly uploaded video data may not replace the previously stored video data. In addition, the source viewpoint number associated with the newly uploaded video data may not replace the stored viewpoint number associated with the previously stored video data.

Figure 5A:
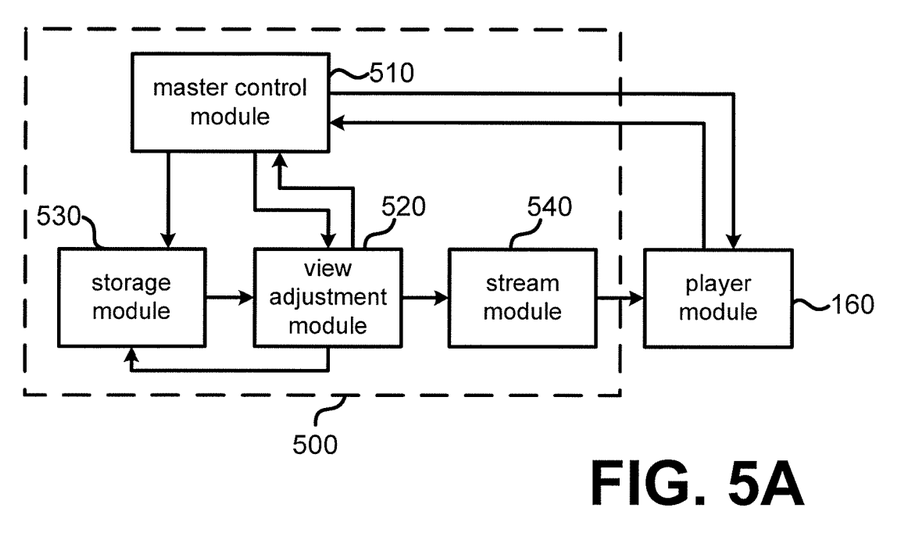
FIGS. 5A & 5B illustrate exemplary video data processing systems for downloading video data consistent with a disclosed embodiment.
Figure 5B:
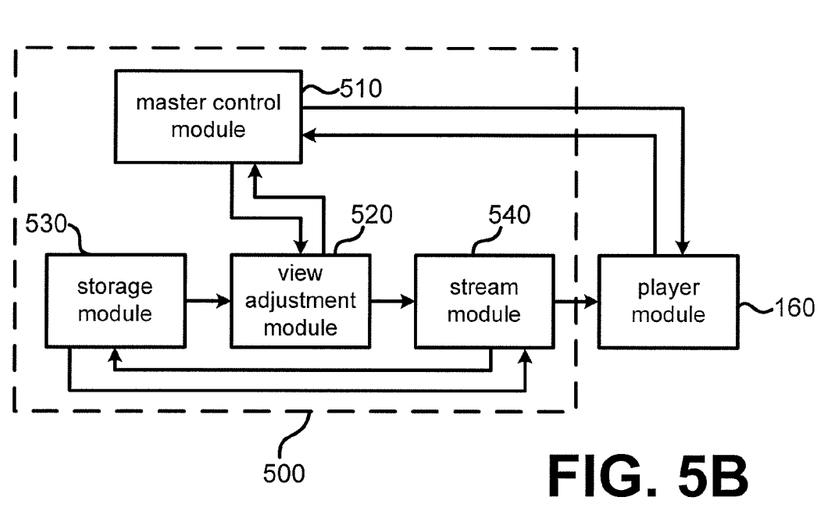

FIGS. 5A and 5B illustrates an exemplary video data processing system for downloading video data consistent with a disclosed embodiment. In one embodiment, the video data processing system 500 may download video data to the player module 160. Referring to FIG. 5A, In an embodiment, the video data processing system 500 may further include a master control module 210 coupled with the player module 160, a view adjustment module 520 coupled with the master control module 510, a storage module 530 coupled with the master control module 510 and the view adjustment module 530, and a stream module 540 for streaming the destination video data with a destination viewpoint number supported by the player module 160. Referring to FIG. 5B, in another embodiment, the video data processing system 500 may further include the master control module 210 coupled with the player module 160, the view adjustment module 520 coupled with the master control module 510, the stream module 540 coupled with the storage module 530 and the view adjustment module 520 for streaming the destination video data with a destination viewpoint number supported by the player module 160. The operation of each module of the video data processing system 500 illustrated in FIGS. 5A and 5B may follow one or more of the embodiments explained in greater detail below.

In an embodiment, the player module 160 may include a display panel for displaying multi-view, three-dimensional video data. The destination viewpoint number is consistent with the number of viewpoints of three-dimensional video data the display panel of the player module 160 is capable of displaying.

Figure 6:
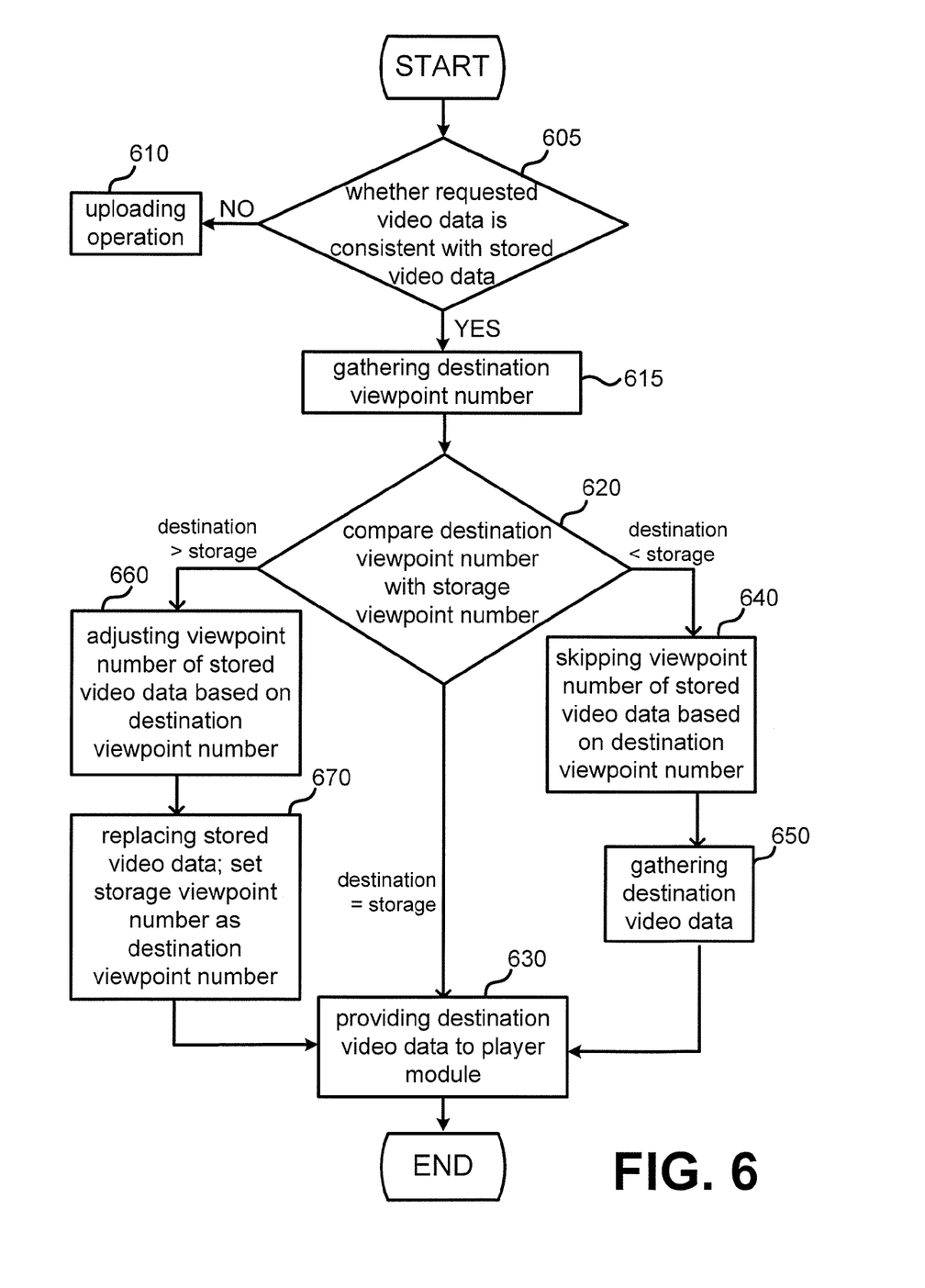
FIG. 6 illustrates an exemplary method for the video data processing system to download video data consistent with a disclosed embodiment.

FIG. 6 illustrates an exemplary method for a video processing system to download video data to the player module consistent with a disclosed embodiment. In an embodiment, a method for downloading video data from the video processing system 500 to the player module 160 may include the following steps. When the player module 160 requests the video data processing system 500 to download a video data for displaying, in step 605, the master control module 510 may determine whether the requested video data is consistent with at least one of the stored video data stored in the storage module 530. If the requested video data is not consistent with any of the stored video data, in step 610, the master control module 510 may search for the requested video data from at least one of the source module 150 and perform an uploading operation if the requested video data is found. If the requested video data is consistent with at least one of the stored video data in the storage module 530, in step 615, the master control module 510 may send a request to the player module 160 to gather the destination viewpoint number supported by the player module 160. After the destination viewpoint number is gathered, in step 620, the master control module 510 may send the destination viewpoint number supported by the player module 160 and the stored viewpoint number associated with the stored video data requested by the player module 160 to the view adjustment module 520 for comparison.

Figure 7:
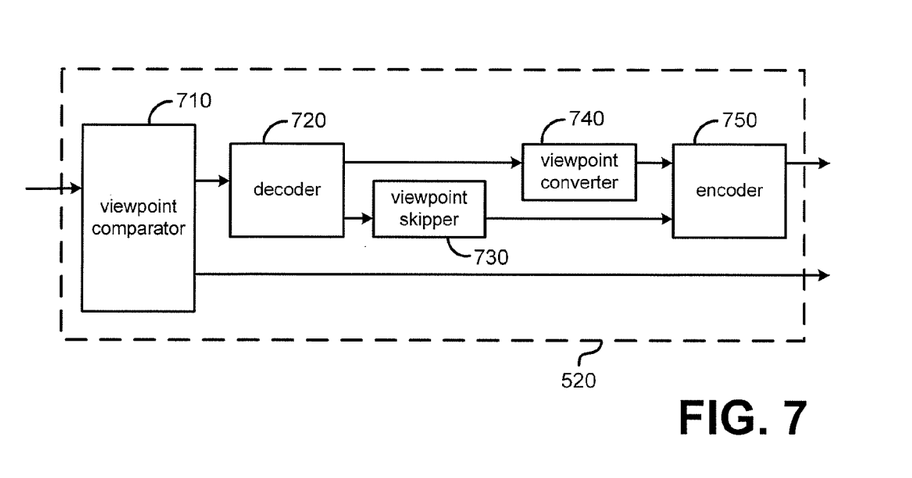
FIG. 7 illustrates a functional block diagram of an exemplary view adjustment module for downloading consistent with a disclosed embodiment.

FIG. 7 illustrates a functional block diagram of an exemplary view adjustment module for downloading operation consistent with a disclosed embodiment. In an embodiment, the view adjustment module 520 may further include a viewpoint comparator 710 coupled with the storage module 530 and the master control module 510, a decoder 720 coupled with the viewpoint comparator 710, a viewpoint skipper 730 coupled with the decoder 720, a viewpoint generator 740 coupled with the decoder 720, and an encoder 750 coupled with the viewpoint skipper 730 and the viewpoint generator 740. The operation of each functional block of the view adjustment module 520 illustrated in FIG. 7 may follow one or more of the embodiments explained in greater detail below.

Referring to FIG. 6, in step 620, the destination viewpoint number supported by the player module 160 and the stored viewpoint number associated with the stored video data requested by the player module 160 may be sent to the viewpoint comparator 710 for comparison. In an embodiment, if the destination viewpoint number is consistent with the stored viewpoint number, in step 630, the result of comparison is provided to the master control module 510 and then, the stored video data is provided to the stream module 540 for downloading to the player module 160. In an embodiment, the video data processing system 500 may upload the video data and adjust the associated viewpoints (if necessary) before receiving the request from the player module 160. The video data may be downloaded to the player module 160 once the player module 160 requests for that. In this embodiment, the time to wait for the processing of the video data in response to the request may be saved.

If the destination viewpoint number is not consistent with (either smaller or larger than) the viewpoint number set by the master control module 510, the view adjustment module 520 may adjust the viewpoint number of the stored view data based on the destination viewpoint number. Referring to FIG. 7, in an embodiment, the stored video data is in compressed form. In this embodiment, both the stored video data may be sent to the decoder 720 for decompression.

In an embodiment, the video data may be a multi-view, three-dimensional video data with different viewpoints. Referring to FIG. 6, if the destination viewpoint number supported by the player module 160 is smaller than the stored viewpoint number associated with the stored video data, in step 640, the decompressed video data may be sent to the viewpoint skipper 730 to skip the viewpoints associated with the decompressed video data. The number of the skipped viewpoint is consistent with the difference between the stored viewpoint number and the destination viewpoint number. Then, in step 650, the viewpoint skipper 730 may provide the decompressed video data with the remaining viewpoints to the encoder 750 for compression. In step 650, the encoder 750 may generate a destination video data with the remaining viewpoints. The number of the remaining viewpoint is consistent with the number of the destination viewpoint supported by the player module 160. Then, in step 630, the destination video data with the remaining viewpoints is provided to the stream module 540 for downloading to the player module 160.

In an embodiment, since the operation of generating viewpoints is much more time and resource consuming then the operation of skipping viewpoints, the stored video data with the stored viewpoint number lager then the destination viewpoint number supported by the display module 160 is not replaced by the destination video data with the remaining viewpoints to be stored in the storage module 530.

In another embodiment, if the destination viewpoint number is larger than the stored viewpoint number, in step 660, the decompressed stored video data may be sent to the viewpoint converter 740. In an embodiment, the stored video data may further include associated depth information. In this embodiment, the decoder 720 may output the decompressed stored video data and the associated depth information to the viewpoint converter 740. As described above, the viewpoint converter 740 may generate the new viewpoints associated with the stored video data and different from the stored viewpoints based on the decompressed stored video data and the associated depth information. In this embodiment, the number of viewpoint associated with the stored video data and generated by viewpoint converter 740 may be consistent with the difference between the destination viewpoint number and the stored viewpoint number. In step 650, the viewpoint converter 740 may provide the decompressed video data with the adjusted viewpoints (including the stored viewpoints and the generated viewpoints generated by the viewpoint converter 740) to the encoder 750 for compression. The encoder 750 may generate a destination video data with the adjusted viewpoint number to the player module 160. The adjustment viewpoint number is consistent with the destination viewpoint number supported by the player module 160.

In step 670, if the adjusted viewpoint number is larger than the stored viewpoint number, the stored video data with the stored viewpoint number smaller than the adjusted viewpoint number may be replaced by the destination video data with the adjusted viewpoint number to be stored in the storage module 530, because the operation of generating viewpoints is much more time and resource consuming then the operation of skipping viewpoints. Then, in step 630, the destination video data with the adjusted viewpoint number is provided to the stream module 540 for downloading to the player module 160.

In another embodiment, the video data processing system 100 may store the information related to the viewpoint number of all the player modules 160 have previously been coupled to the video data processing system 100. In this embodiment, the viewpoint number set by the master control module 110 is set as the viewpoint number supported by most of the previously coupled play modules 160. Thus, it is more likely that the stored viewpoint number of the stored video data is consistent with the destination viewpoint number than other embodiments which the viewpoint number set by the master control module 110 may not be determined based on the destination viewpoint number supported by the most previously coupled player module 160. Furthermore, since it is more likely that the stored viewpoint number of the stored video data is consistent with the destination viewpoint number supported by the player module 160, it is more likely that the viewpoint comparator 710 in this embodiment may output the stored video data with the stored viewpoint number to the stream module 540 without further processing by the view adjustment module 520. Therefore, in this embodiment, the time and the resource of the video data processing system 500 for processing the stored video data for downloading may be saved.

It may be apparent to those skilled in the art that various modifications and variations can be made in the disclosed process without departing from the scope or spirit of the disclosed embodiments. Other embodiments may be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A video data processing system comprising:
   a control module coupled with a source module for receiving video data from the source module, the video data being associated with at least one source viewpoint; and
   a view adjustment module coupled with the control module, including:
      a view point comparator for comparing a number of the at least one source viewpoint and a set viewpoint number; and
      a viewpoint adjustor coupled with the viewpoint comparator for generating at least one adjusted viewpoint of the video data if the number of the at least one source viewpoint is smaller than the set viewpoint number;
   wherein the set viewpoint number is associated with at least one of a viewpoint number of at least one previously received video data and a viewpoint number of at least one previously coupled player module.

2. The system of claim 1, wherein the number of the at least one adjusted viewpoint generated by the viewpoint adjustor is consistent with the difference between the set viewpoint number and the number of the at least one source viewpoint.

3. The system of claim 1, wherein the viewpoint adjustor further includes a depth generator for generating a depth information associated with the video data, wherein the at least one adjusted viewpoint associated with the video data is generated based on at least one of the video data, the at least one source viewpoint associated with the video data, and the depth information associated with the video data.

4. The system of claim 1, wherein the video data processing system further includes a storage module coupled with the control module and the view adjustment module for storing the video data and a stored viewpoint associated with the video data, wherein a number of the stored viewpoint is consistent with at least one of the number of the at least one source viewpoint and the set viewpoint number.

5. The system of claim 4, wherein if the number of the at least one source viewpoint is smaller than the set viewpoint number, the number of the stored viewpoint associated with the video data is consistent with the set viewpoint number.

6. The system of claim 4, wherein if the number of the at least one source viewpoint is not smaller than the set viewpoint number, the number of the stored viewpoint associated with the video data is consistent with the number of the at least one source viewpoint.

7. The system of claim 4, wherein the storage module is for storing the at least one previously received video data and a viewpoint associated with the at least one previously received video data.

8. The system of claim 7, wherein the control module is for determining whether the video data is consistent with the at least one video data previously received by the video data processing system.

9. The system of claim 8, wherein if the number of the at least one source viewpoint associated with the video data is larger than the previously stored viewpoint associated with the at least one previously received video data, the at least one previously received video data being stored in the storage module is replaced by the video data being uploaded from the source module.

10. The system of claim 1, wherein the set viewpoint number is associated with a viewpoint number of a plurality of video data previously received by the video data processing system.

11. The system of claim 1, wherein the set viewpoint number is associated with a viewpoint number of the most of a plurality of player modules previously coupled to the video data processing system.

12. A video data processing method comprising:
   receiving video data from the source module, the video data being associated with at least one source viewpoint;
   comparing a number of the at least one source viewpoint and a set viewpoint number; and
   generating at least one adjusted viewpoint of the video data if the number of the at least one source viewpoint is smaller than the set viewpoint number;
   wherein the set viewpoint number is associated with at least one of a viewpoint number of at least one previously received video data and a viewpoint number of at least one previously coupled player module.

13. The method of claim 12, wherein the number of the generated at least one adjusted viewpoint is consistent with the difference between the set viewpoint number and the number of the at least one source viewpoint.

14. The method of claim 12, wherein the method further includes generating a depth information associated with the video data, wherein the at least one adjusted viewpoint associated with the video data is generated based on at least one of the video data, the at least one source viewpoint associated with the video data, and the depth information associated with the video data.

15. The method of claim 12, wherein the method further includes storing the video data and a stored viewpoint associated with the video data, wherein a number of the stored viewpoint is consistent with at least one of the number of the at least one source viewpoint and the set viewpoint number.

16. The method of claim 15, wherein if the number of the at least one source viewpoint is smaller than the set viewpoint number, the number of the stored viewpoint associated with the video data is consistent with the set viewpoint number.

17. The method of claim 15, wherein if the number of the at least one source viewpoint is not smaller than the set viewpoint number, the number of the stored viewpoint associated with the video data is consistent with the number of the at least one source viewpoint.

18. The method of claim 15, wherein the method further includes storing the at least one previously received video data and a viewpoint associated with the at least one previously received video data.

19. The method of claim 18, wherein the method further includes determining whether the video data is consistent with the at least one previously received video data.

20. The method of claim 19, wherein the method further includes replacing the at least one previously received video data by the video data if the number of the at least one source viewpoint associated with the video data is larger than the previously stored viewpoint associated with the at least one previously received video data.

21. The method of claim 12, wherein the set viewpoint number is associated with a viewpoint number of a plurality of previously received video data.

22. The method of claim 12, wherein the set viewpoint number is associated with a viewpoint number of a plurality of previously coupled player modules.

* * * * *